United States Patent
Hornbachner et al.

(10) Patent No.: US 12,040,736 B2
(45) Date of Patent: Jul. 16, 2024

(54) LIGHTING DEVICE AND SOLAR POWER SUPPLY THEREFOR

(71) Applicant: ICGH Investment and Consulting GmbH, Vienna (AT)

(72) Inventors: Dieter Hornbachner, Vienna (AT); Ismar Mulalic, Vienna (AT); Tim Kovacic, Vienna (AT)

(73) Assignee: ICGH Investment and Consulting GmbH, Vienna (AT)

( * ) Notice: Subject to any disclaimer, the term of this patent is extended or adjusted under 35 U.S.C. 154(b) by 26 days.

(21) Appl. No.: 17/762,113

(22) PCT Filed: Aug. 13, 2020

(86) PCT No.: PCT/EP2020/072750
§ 371 (c)(1),
(2) Date: Mar. 21, 2022

(87) PCT Pub. No.: WO2021/063579
PCT Pub. Date: Apr. 8, 2021

(65) Prior Publication Data
US 2022/0352843 A1 Nov. 3, 2022

(30) Foreign Application Priority Data
Oct. 2, 2019 (EP) ..................... 19201024

(51) Int. Cl.
*H02S 20/10* (2014.01)
*F21S 9/03* (2006.01)
*H02S 20/30* (2014.01)

(52) U.S. Cl.
CPC .............. *H02S 20/10* (2014.12); *F21S 9/035* (2013.01); *H02S 20/30* (2014.12)

(58) Field of Classification Search
CPC .................................. F21S 9/035; F21S 9/037
See application file for complete search history.

(56) References Cited

U.S. PATENT DOCUMENTS

| | | |
|---|---|---|
| 2012/0211046 A1 | 8/2012 | Smyth et al. |
| 2013/0322063 A1 | 12/2013 | Tittle |

(Continued)

FOREIGN PATENT DOCUMENTS

| | | | |
|---|---|---|---|
| KR | 101544202 B1 * | 8/2015 | ............... F21S 9/03 |
| WO | 2011115419 A2 | 9/2011 | |

(Continued)

OTHER PUBLICATIONS

English machine translation of Yoon et al. (KR 101544202 B1) provided by the Korean Intellectual Property Office website, 2023, All Pages. (Year: 2023).*

(Continued)

*Primary Examiner* — Daniel P Malley, Jr.
(74) *Attorney, Agent, or Firm* — Hoffmann & Baron, LLP

(57) ABSTRACT

The disclosed subject matter relates to a solar power supply device for a light, comprising at least one tubular solar module that can be slid onto a mast, and a crown which can be fitted to the top of the mast and from which the solar module is suspended, wherein the solar module contains in its interior at least one pair of spring elements that can be resiliently spread apart, between which the mast can be passed through. The invention further relates to a lighting device comprising a mast and a solar power supply device of this kind, the crown of which is fitted to the top of the mast and through the spread-apart spring elements of which the mast is passed through, and at least one light that is supported by the solar power supply device and is electrically powered thereby.

20 Claims, 6 Drawing Sheets

(56) References Cited

U.S. PATENT DOCUMENTS

| | | | |
|---|---|---|---|
| 2014/0360559 A1* | 12/2014 | Braghiroli | F21S 8/086 |
| | | | 136/251 |
| 2015/0354243 A1* | 12/2015 | Tresserras Picas | F21V 21/108 |
| | | | 248/51 |
| 2017/0250647 A1 | 8/2017 | Kornovich | |

FOREIGN PATENT DOCUMENTS

| | | | |
|---|---|---|---|
| WO | 2012116696 A1 | 9/2012 | |
| WO | 2013093402 A2 | 6/2013 | |
| WO | 2016018952 A1 | 2/2016 | |

OTHER PUBLICATIONS

European Patent Office Search Report corresponding to Application No. 19201024.7-1230, dated Dec. 6, 2019.
PCT International Search Report corresponding to Application No. PCT/EP2020/072750, dated Oct. 20, 2020.
PCT International Search Report corresponding to Application No. PCT/EP2020/072750, dated Nov. 24, 2020.
International Preliminary Report on Patentability dated Apr. 5, 2022, in corresponding International Application No. PCT/EP2020/072750.

\* cited by examiner

LIGHTING DEVICE AND SOLAR POWER SUPPLY THEREFOR

CROSS-REFERENCE TO RELATED APPLICATIONS

This application is a National Phase application of International Application No. PCT/EP2020/072750 filed Aug. 13, 2020 which claims priority to the European Patent Application No. 19 201 024.7 filed Oct. 2, 2019, the disclosures of which are incorporated herein by reference.

TECHNICAL FIELD

The present disclosed subject matter relates to a solar power supply device for a light, comprising at least one tubular solar module that can be slid onto a mast. The disclosed subject matter also relates to a lighting device comprising a mast and a light powered by a solar power supply device of this kind.

BACKGROUND

Tubular photovoltaic or solar modules are known from European patent EP 2 071 635 B1 by the same applicant and have the advantage that light can be utilized from all sides of the solar module. This also eliminates specific alignment of the solar module with the sun during assembly and operation; in addition, diffuse light from all sides can be received. Owing to its tubular design, the solar module can be coaxially arranged on the mast, which requires a particularly small amount of space and allows for particularly esthetically pleasing lighting devices, e.g. for street lighting.

Currently, masts comprising support rings welded thereto, on which the solar modules slid onto the mast are supported, are used for assembling the solar modules. This requires specially prefabricated masts. The diameter of the mast also has to be adapted to the internal diameter of the solar module, since said module is supposed to be in contact with the mast with as little play as possible in order to be anchored. Industrially standardized masts, in particular, are unsuitable for this, since they are slightly conical. Furthermore, cables need to run in the mast, which requires accordingly prefabricated passages and ducts in the mast. Until now, for the assembly of tubular solar modules, cylindrical masts prefabricated with passages and ducts that have been especially manufactured for this purpose have therefore been required, and this increases the costs.

BRIEF SUMMARY

The disclosed subject matter aims to provide a solar power supply device for lights that is constructed from tubular solar modules and can be assembled in a particularly simple manner using cost-effective, standardized, optionally also conical masts.

This aim is achieved by a solar power supply device for a light, comprising at least one tubular solar module that can be slid onto a mast, and a crown which can be fitted to the top of the mast and from which the solar module is suspended, the solar module containing in its interior at least one pair of spring elements that can be resiliently spread apart, between which the mast can be passed through.

The assembly solution according to the disclosed subject matter does not require any special dimensions or configurations of the mast, except that the crown can be fitted to the top of the mast and the mast can be passed through the solar module. As long as the internal diameter of the crown and solar module is large enough for it to be able to receive the external diameter of the top of the mast and of the mast in this region, any mast can be used, in particular a cost-effective, industrially standardized, optionally also slightly conical, mast. Special passages or ducts for cables or even special support plates on the mast for the solar modules are not required. The solar module is suspended from the crown fitted to the top of the mast, and this minimizes the mechanical load on the delicate solar module, which is no longer supported on or clamped to the mast, but instead is freely suspended therefrom, so to speak. In this case, the spring elements bring about automatic centering of the solar module on the mast. When the mast has sufficient play in the solar module, e.g. an external diameter of 60 mm, and the solar module has an internal diameter of 120 mm, temporary deflection of the mast relative to the solar module, as can occur in high winds in particular, can also be accommodated by the spring elements and the solar module can be automatically returned to the centered position in a spring-mounted manner. Cables, where required, can run between the crown and the suspended solar module and/or in the annular space between the mast and the solar module or crown, such that no cables have to be guided in the mast itself. As a result, simple, secure and cost-effective assembly, which also protects the solar module, is achieved.

The solar module optionally supports at least two axially spaced-apart pairs of spring elements, which improves the automatic return of the solar module to the centered position on the mast after a temporary deflection due to wind.

As a rule, the spring elements may be of any type known in the art, for example disc springs, leaf springs, spring-mounted pressure pieces or the like. It is particularly advantageous for each spring element to be a tension coil spring, which substantially diametrically crosses the interior of the solar module when not spread apart, which results in a very simple construction.

The two tension coil springs in a spring-element pair may for example cross the interior of the solar module so as to lie beside one another at the same height in the solar module or so as to lie one above the other at different heights in the solar module. In both cases, when inserting the mast into the solar module or when sliding the solar module onto the mast, they can be forced or spread apart by the mast in a simple manner, in order to center the mast therebetween in a spring-mounted manner.

In a particularly advantageous embodiment of the disclosed subject matter, the solar module is movably connected to the crown. This protects the delicate solar module against damage in strong winds. For example, a 16 m tall mast may deflect by up to ±1 m at the top at wind speeds of over 160 km/h. Movably mounting the solar module on the crown in conjunction with supporting the solar module on the mast in a spring-mounted manner makes it possible to accommodate such movements by means of the spring elements without the solar module hitting the mast.

An optional configuration of this movable mounting is that there is an axial gap between the solar module and the crown, the two parts, the solar module and the crown, being connected by at least two pins which are distributed over their circumference and are mounted on at least one of the two parts with axial play. This allows the solar module to be mounted on the crown in a very simple, movable manner, such that the solar module can tilt relative to the crown by utilizing said axial play in order to accommodate a curvature of the mast when it deflects. The gap can simultaneously be used for ventilation and therefore cooling of the solar module.

It is particularly advantageous for each pin to be fixed to one of the two parts and to be able to be locked in a bayonet groove in the other part detachably and with axial play by means of a widened head. As a result, during assembly, the two parts, the solar module and the crown, can be interconnected simply by inserting the pin heads into the bayonet grooves and are then retained with axial play in order to permit said movements.

In a further advantageous embodiment of the disclosed subject matter, another, identical solar module is, optionally movably, suspended from said solar module. Another, identical solar module can in turn be, again optionally movably, suspended from the former solar module, and so on. The solar power supply device according to the disclosed subject matter is thus in the form of a successive chain of solar modules suspended from one another, the uppermost solar module being suspended from the crown fitted to the top of the mast. When the solar modules are accordingly movably suspended from one another, the entire chain of solar modules can then follow deflection movements of the mast in high winds without the solar modules being damaged.

Also for movably mounting the solar modules on one another, there may optionally again be an axial gap between the solar modules, and the solar modules are interconnected by at least two pins which are distributed over their circumference and are mounted on at least one of the two solar modules with axial play. In this case, each pin is again optionally mounted on the one solar module in a fixed manner and can be locked in a bayonet groove in the other solar module detachably and with axial play by means of a widened head. This gap can also be used for ventilation and cooling of the solar modules.

According to another optional feature of the disclosed subject matter, each solar module may comprise a tubular transparent body having photovoltaic elements on its inner face, the body being retained between two end rings, which are interconnected by rods extending in the interior of the solar module. The end rings together with the rods accommodate the structural loads of the suspension of the solar modules, such that the glass body and the photovoltaic elements are protected against excessive loads.

The crown may optionally also support an end ring of this kind on its lower end. The end rings may also be used to mount said pins thereon, in particular by means of the bayonet grooves, which may be made in the end rings.

In another advantageous configuration of the disclosed subject matter, the crown has an inner shoulder for support on the upper face of the top of the mast and can be aligned coaxially with the mast by means of adjusting screws which are distributed over its inner circumference and can be brought into contact with the top of the mast. The crown therefore balances on the top of the mast, so to speak, and is centered and fixed by the adjusting screws.

The light powered by the solar power supply device can be mounted both on the crown and on one of the solar modules, for example on the lower end of the lowermost solar module. In a further embodiment, the crown supports at least one projecting arm, optionally two diametrically projecting arms, each for mounting a light, in order to obtain the largest possible illuminated region. Here, each arm may optionally be mounted on the crown in an angularly adjustable manner in order to orient the illuminated region.

In another aspect, the disclosed subject matter provides a lighting device comprising a mast and a solar power supply device of the type set out here, the crown of which is fitted to the top of the mast and through the spread-apart spring elements of which the mast is passed through. The lighting device has at least one light that is supported by the solar power supply device and is electrically powered thereby.

BRIEF DESCRIPTION OF THE DRAWINGS

The disclosed subject matter will be explained in greater detail in the following with reference to embodiments shown in the accompanying drawings, in which.

DETAILED DESCRIPTION

Figure 1:
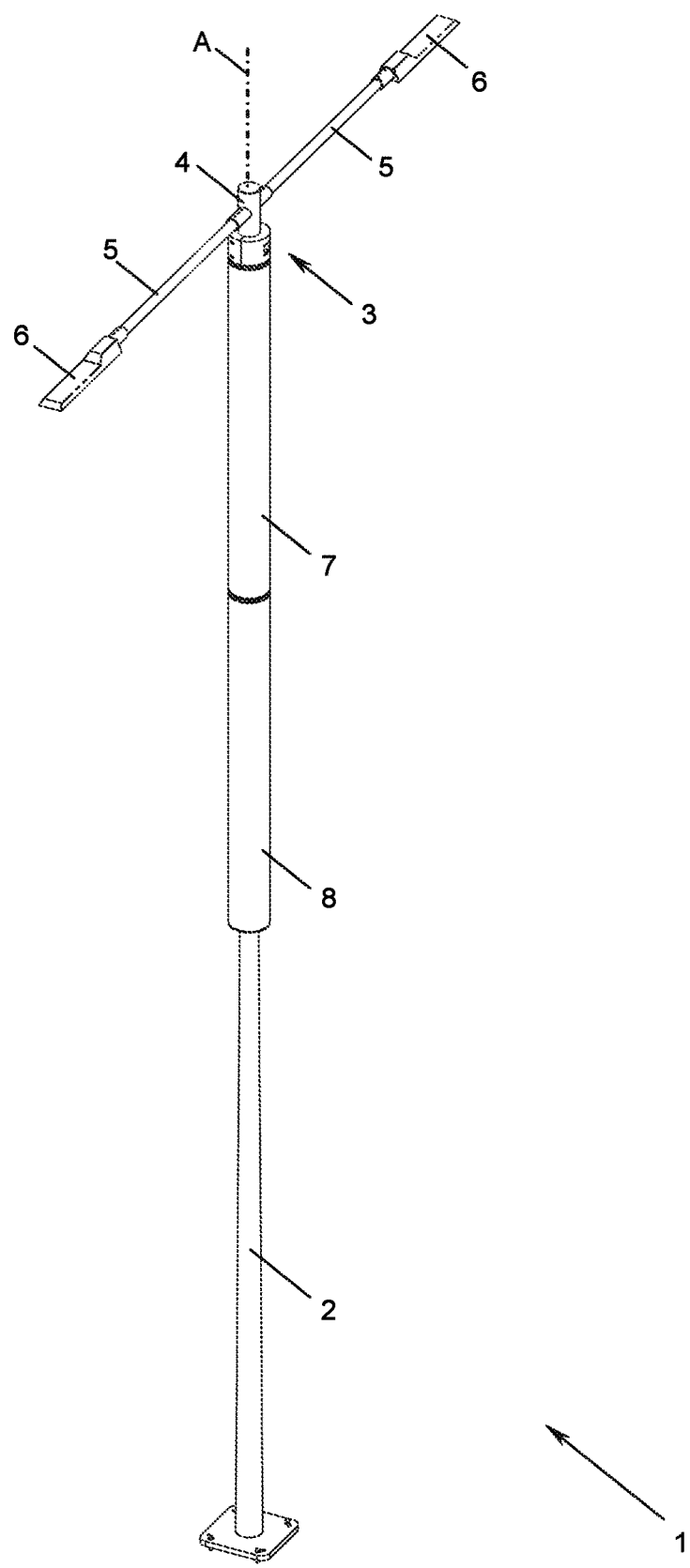
FIG. 1 is a perspective view of the lighting device of the disclosed subject matter.

FIG. 1 shows a lighting device 1 for public spaces, e.g. a street, comprising a mast 2 (only details of this are shown). An approximately annular, hat-shaped or pot-shaped crown 4 is fitted to the top 3 of the mast 2, as will be explained in greater detail below. The crown 4 supports one or more projecting arms 5 (here, two diametrically projecting arms), on each of which one light 6 is mounted.

Two substantially tubular solar modules 7, 8 are approximately coaxially slid onto the mast 2, the upper solar module 7 being suspended from the crown 4 and the lower solar module 8 being suspended from the upper solar module 7. The mast 2 and the solar modules 7, 8 have a common longitudinal axis A, even though this is not necessary. The solar modules 7, 8 supply the lights 6 with electrical power via cables (not shown), which run in the interior of the solar modules 7, 8, the crown 4 and the arms 5.

In the present description, the term "tubular" is understood to mean a tube having any cross section, whether this is a circular, oval, rectangular, square, triangular or any polygonal cross section. Preferably, although not necessarily, the crown 4 and the solar module(s) 7, 8 therebelow have the same cross section.

An electrical controller and one or more buffer batteries or rechargeable batteries may be arranged in the interior of the solar modules 7, 8, the mast 2 and/or an external switch box (not shown) and may be connected to the electrical cables in order to buffer or supply the solar power from the solar modules 7, 8 for the lights 6. The lighting device 1 accordingly does not need to be connected to the public electricity grid, i.e. it can be operated autonomously using sunlight.

In the example shown, the lighting device 1 has two identical solar modules 7, 8. It is clear that only one or more than two solar modules 7, 8 may be provided, which are each suspended from one another in succession, and that the two or more solar modules 7, 8 may also be different from one another.

In an exemplary embodiment, the mast 2 has a height of 4-20 m above ground, e.g. 8 m, and the axial length of a solar module 7, 8 is 1.0-4 m, e.g. approx. 2 m. The mast 2 is slightly conical and tapers upwards, and has an external diameter of e.g. 60-90 mm in each region in which the solar modules 7, 8 are mounted, and the solar modules 7, 8 have an internal diameter of e.g. 100-150 mm.

Figure 2:
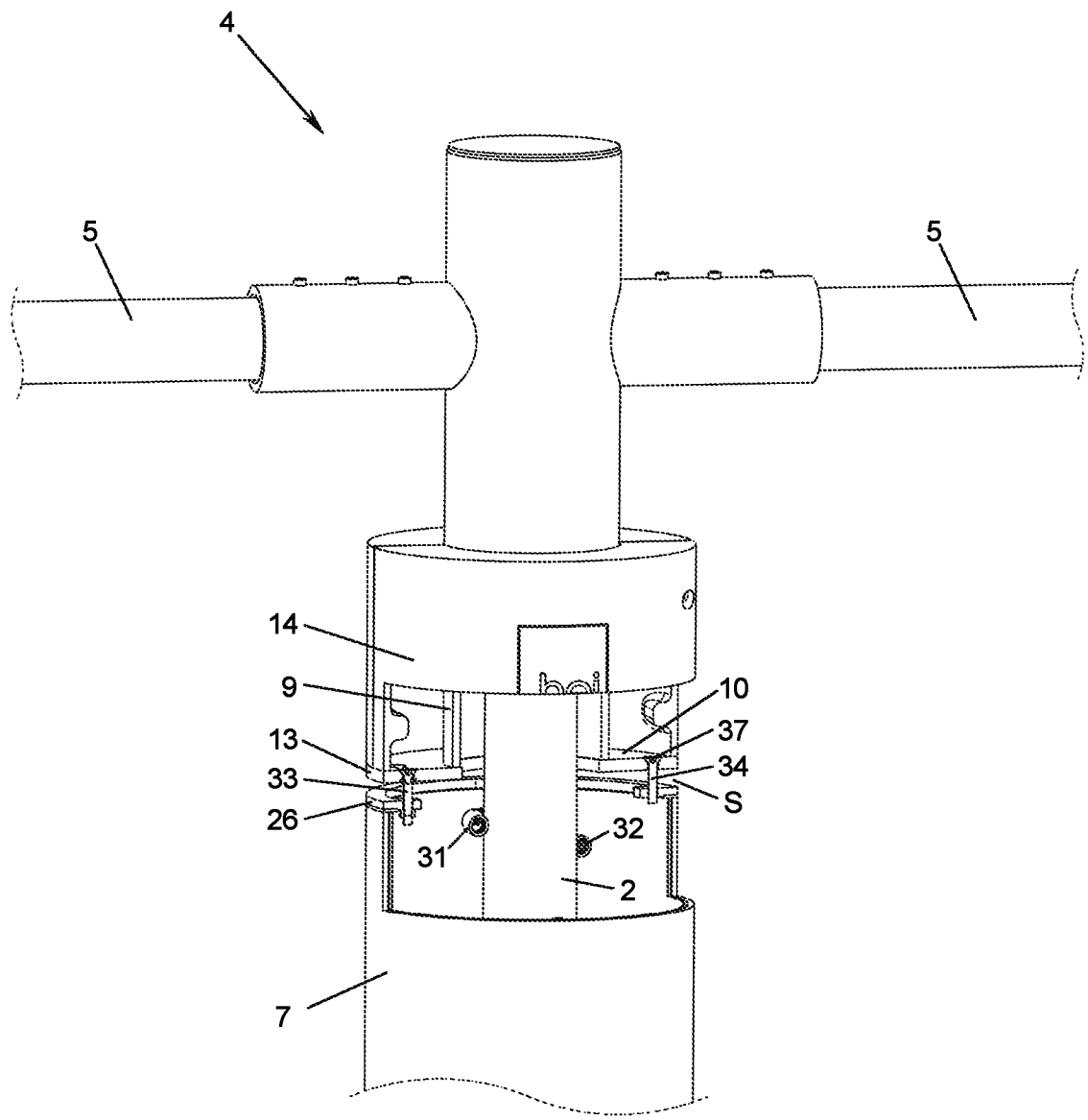
FIG. 2 is a partially cut-away perspective view of a detail of the upper part of the lighting device from FIG. 1.
Figure 5:
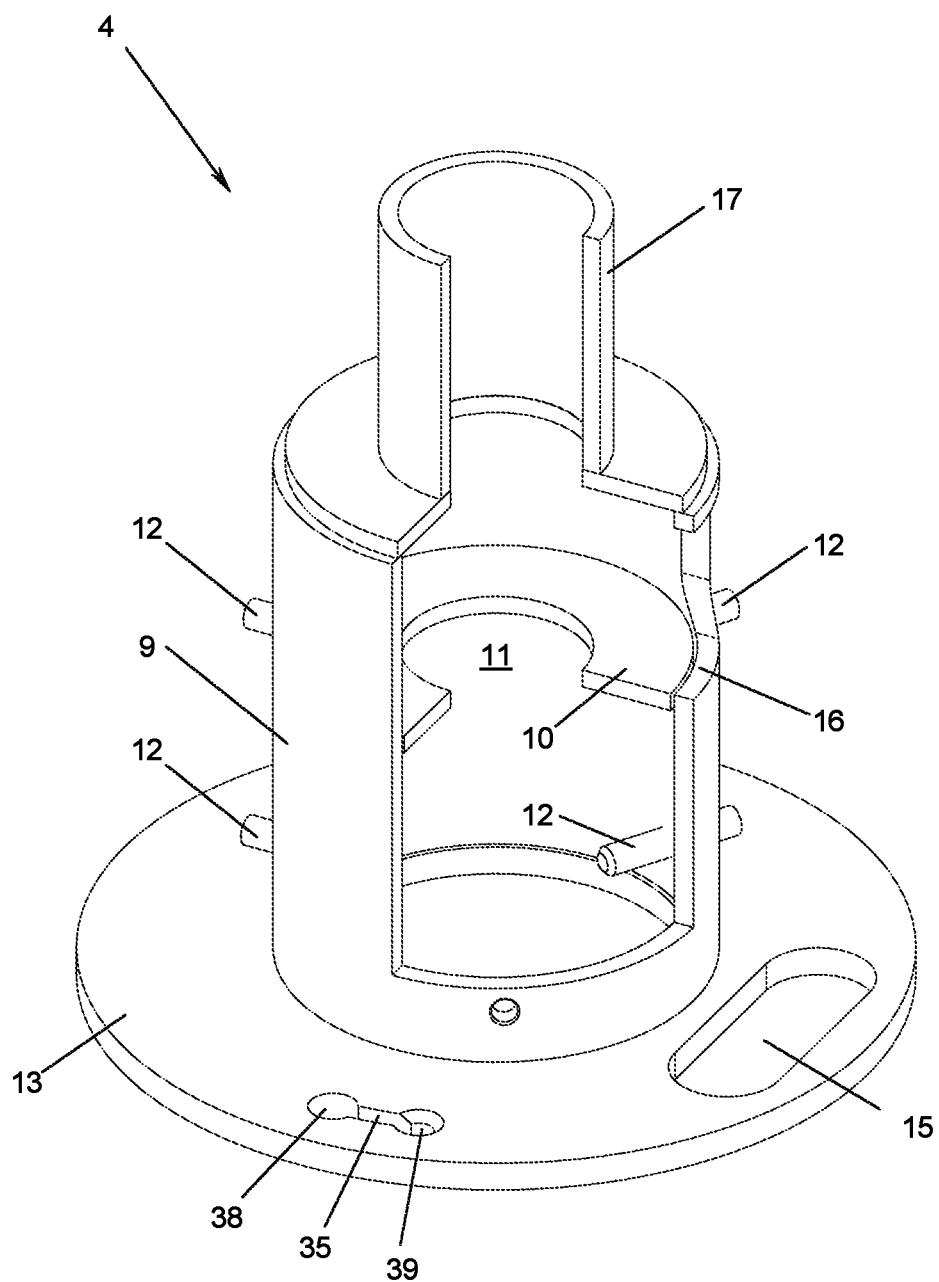
FIGS. 5 and 6 are each partially cut-away perspective views of two alternative embodiments of the crown of the lighting device from FIG. 1.
Figure 6:
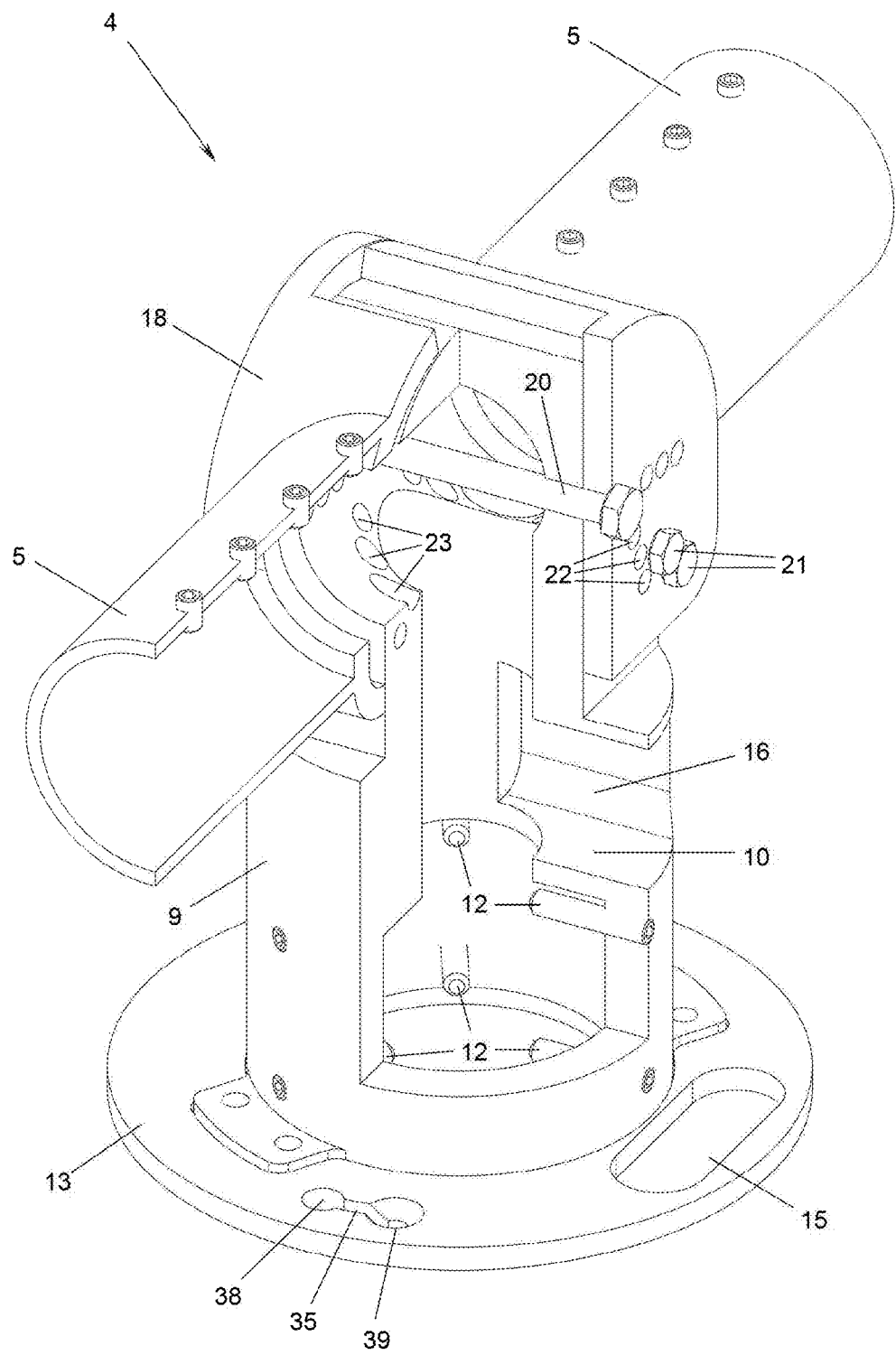

With reference to FIGS. 2, 5 and 6, the crown 4 has an approximately tubular main body 9 comprising an inner shoulder 10, which is supported on the upper face of the top 3 of the mast 2 and surrounds the top 3 of the mast with radial play. For example, the internal diameter of the main body 9 is approximately 100 mm and the external diameter of the top 3 of the mast is approximately 60 mm. The main body 9 and the inner shoulder 10 may also be considered to be in the form of a hat or upside-down pot comprising a hole 11, which is fitted to the top 3 of the mast. The hole 11 may also be omitted, i.e. the inner shoulder 10 may be formed by a plate.

By means of a plurality of adjusting screws 12, which are distributed over its inner circumference and may be arranged at two different heights, the main body 9 can be aligned coaxially with the mast 2. The adjusting screws 12 are then screwed in far enough that they are in contact with the outer circumference of the top 3 of the mast and center it in the main body 9.

At its lower end, the main body 9 of the crown 4 supports an end ring 13 for suspending the uppermost solar module 7, as described in detail below. The end ring 13 is simultaneously used for supporting a cover cap 14, which not only covers the adjusting screws 12 but also provides an annular space between the cover cap 14 and the main body 9, which is used for guiding cables through an opening 15 in the end ring 13 and a lateral opening 16 in the main body 9 and from there into the arms 5.

In the embodiment in FIG. 2, the arms 5 are screwed directly to the upper end of the main body 9 of the crown 4. In the embodiment in FIG. 5, the upper end of the main body 9 is designed as a connecting piece 17, on which one or more standardized projecting arms 5 comprising lights 6 can be mounted.

In the embodiment in FIG. 6, the arms 5 are mounted on the crown 4 in an angularly adjustable manner. To do this, each arm 5 is equipped with a disc or shell 18, 19, which are mounted on a common shaft 20 penetrating the crown 4. By means of insertion pins 21, which can selectively be inserted into different holes 22 in the shells 18, 19 and respective counter-holes 23 in the main body 9 of the crown 4 when they are correspondingly brought into alignment, the arms 5 can be locked in different angular positions relative to the crown 4.

Figure 3:
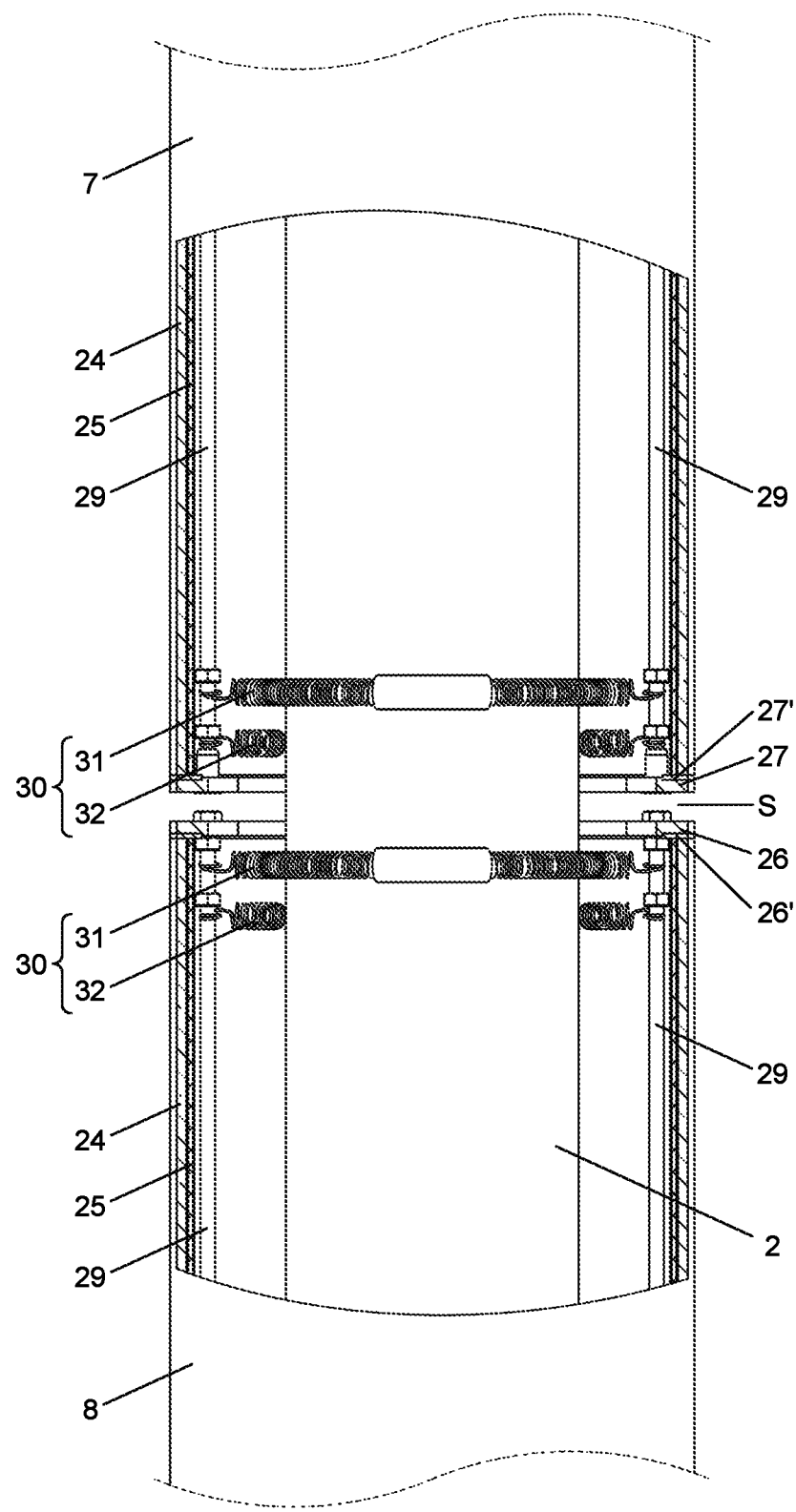
FIG. 3 is a partially cut-away side view of a detail of the central part of the lighting device from FIG. 1.

According to FIGS. 2-4, each solar module 7, 8 has a tubular body 24 made of transparent material, e.g. glass or plastics material, which is equipped with photovoltaic elements 25 on its inner face and protects them against environmental influences. The photovoltaic elements 25 may for example be in the form of a plurality of small plates, which are wired to one another and line the inner face of the body 25 in the manner of a matrix. Alternatively, the photovoltaic elements 25 may be curved in a manner adapted to the inner circumference of the body 25, for example in the form of a tubular, multilayered composite element, as described in the above-mentioned patent EP 2 071 635 B1 by the same applicant.

It is also possible for each solar module 7, 8 to be made of one or more flexible photovoltaic element(s) that are rolled up or folded together to form a tube, for example made of flexible thin-film photovoltaic modules. In other variants, each solar module 7, 8 may e.g. be composed of individual photovoltaic strips extending in the axial direction of the solar module. For example, rigid, planar, elongate photovoltaic elements 25 may directly form the sides of a tubular solar module 7, 8 having a polygonal cross section, e.g. having a triangular, square, hexagonal or octagonal cross section, etc., optionally also without a protective transparent body 24.

In the present example, the transparent body 24 together with the photovoltaic elements 25 attached to its inner face is retained between two end rings 26, 27, which in turn are interconnected by rods 29 extending in the interior of the solar module 7, 8. For example, two or more rods 29 distributed over the circumference of the solar module 7, 8 are provided. Together with the support rings 26, 27, the rods 29 form the mechanical supporting structure of the solar module 7, 8, such that no tensile forces, compressive forces or shear forces are exerted on the body 24 comprising the delicate photovoltaic elements 25, either by the suspension of the solar modules 7, 8 or by winds during operation. A resilient seal 26', 27' may be provided between each support ring 26, 27 and the transparent body 24 retained thereby, in order to accommodate different thermal expansion coefficients of the rods 29 on one hand and of the body 24 or photovoltaic elements 25 on the other hand.

In order to accommodate movements of the mast 2 under the effect of wind without the solar modules 7, 8, in particular the delicate transparent body 24 and photovoltaic elements 25, being damaged, the solar modules 7, 8 are connected movably to one another and/or the uppermost solar module 7 is movably connected to the crown 4. The movable connection may be of any known type, e.g. cables, wires, chains, hinges, joints, etc. FIGS. 2, 3, 5 and 6 show a special type of movable connection between the crown 4 and the uppermost solar module 7 suspended therefrom or between two solar modules 7, 8 suspended from one another, which connection is characterized by simplicity and rapid assembly on site. This is a bayonet connection between the end rings 13, 26, 27 that each face one another, i.e. between the lower end ring 13 of the crown 4 and the upper end ring 26 of the uppermost solar module 7 or between the lower end ring 27 of an upper solar module 7 and the upper end ring 26 of a lower solar module 8.

To do this, one of the two end rings 4, 26 or 27, 26 involved comprises at least two pins 33, 34 that are distributed over its circumference and are securely mounted thereon, and the other of the two end rings 26, 4 or 26, 27 comprises bayonet grooves 35, 36 interacting therewith, in which the pins 33, 34, each comprising a widened head 37, can be locked in the manner of a bayonet, but with axial play. For this purpose, there is an axial gap S between each of the end rings 4, 26 and 27, 26 involved in the bayonet connection. The gaps S also allow the solar modules 7, 8 and/or the crown 3 to be ventilated in order to cool the electronic components received therein and the photovoltaic elements 25. When joined together in the axial direction, the heads 37 of the pins 33, 34 are inserted into widened initial portions 38 of the bayonet grooves 35, 36, and then one end ring is rotated relative to the other end ring about the axis A, e.g. by 15°, meaning that the pins 33, 34 slide in the bayonet grooves 35, 36 in the circumferential direction until they contact the end of narrowed end portions 39 of the bayonet grooves 35, 36. Owing to their heads 37, which are wider than the end portions 39, they are retained therein in the axial direction. The end portions 39 of the bayonet grooves 35, 36 may also be slightly countersunk in the axial direction in order to latch the heads 37 therein against the bayonet connection opening unintentionally.

When part of the bayonet connection tilts relative to the other part, e.g. when the solar module 7 tilts relative to the crown 4 or the solar module 8 tilts relative to the solar module 7, (at least) one head 37 can lift up, in the axial direction, out of its retained or latched position in the end portion 39 or its countersunk portion, i.e. the anchoring of the pin 33, 34 in question has axial play here.

If the pins 33, 34 are formed by screws, they can simply be securely anchored in one end ring 13, 26, 27 by being screwed into corresponding holes, while the screw head thereof acts as a head 37 for being axially movably anchored on the other end ring 13, 26, 27.

As is clear from the drawings, each solar module 7, 8 has an internal diameter or a clear width which is considerably greater than the external diameter of the mast 2 passing through at that point. The mast 2 therefore has considerable radial play in the solar module 7, 8, which serves to accommodate deflections or bending of the mast 2 under the effect of wind. As a result, the mast 2 can bend or deflect in strong winds without hitting the inner circumference of the relevant solar module 7, 8. For example, the internal diameter, i.e. the clear width, of the solar modules 7, 8 is approximately 100-150 mm, e.g. 120 mm, while the external diameter of the mast 2 passed therethrough is approximately 40-80 mm, e.g. 60 mm, in this region.

In order to center the solar modules 7, 8 in the rest state, i.e. without any wind, on the mast 2 for static and also esthetic reasons, each solar module 7, 8 is equipped in its interior with at least one pair 30 of spring elements 31, 32 that can be resiliently spread apart, between which the mast 2 is passed through. For example, at least two pairs 30 are provided per solar module 7, 8, in particular at least one pair 30 on each of the two ends of the solar modules 7, 8.

Figure 4A:
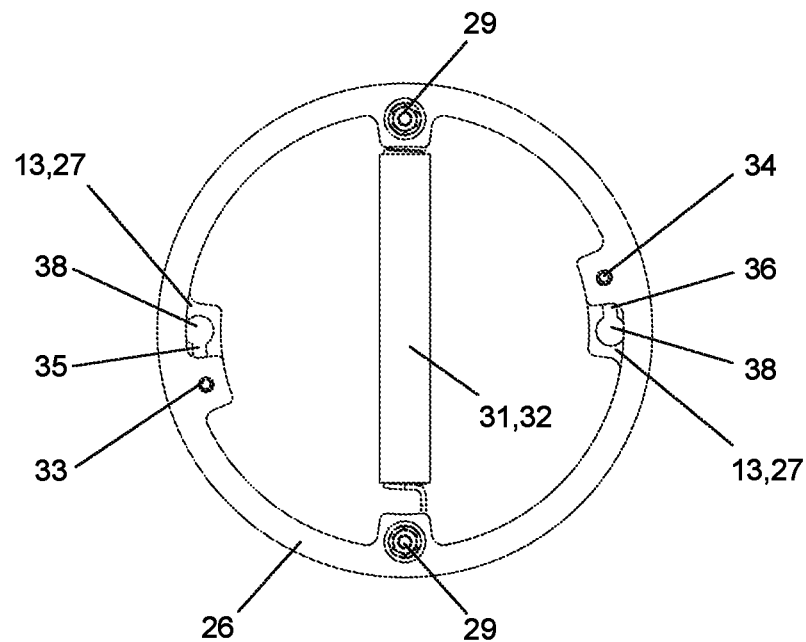
FIGS. 4a and 4b each show a cross section through the lighting device from FIG. 1 at the height of a spring-element pair, once with spring elements in the rest state (FIG. 4a) and once with the spring elements spread apart (FIG. 4b)

FIG. 4a shows the spring elements 31, 32 in the rest state when not spread apart, in which they substantially diametrically cross the interior of the solar module 7, 8. Each spring element 31, 32 is tensioned between two rods 29 that are opposite one another on the inner circumference of the solar module 7, 8. Alternatively, the end rings 26, 27 could also be used for mounting the spring elements 31, 32.

In the example shown, each spring element 31, 32 is formed by a tension coil spring, which can optionally be sheathed with a slide sleeve 31', 32'. The two spring elements 31, 32 in a pair 30 are arranged directly above one another when viewed in the axial direction of the solar module 7, 8. It is, however, also possible to tension the spring elements 31, 32 in a pair 30 beside one another at the same height in the solar module 7, 8 or also at completely different heights with mutual axial spacing.

Figure 4B:
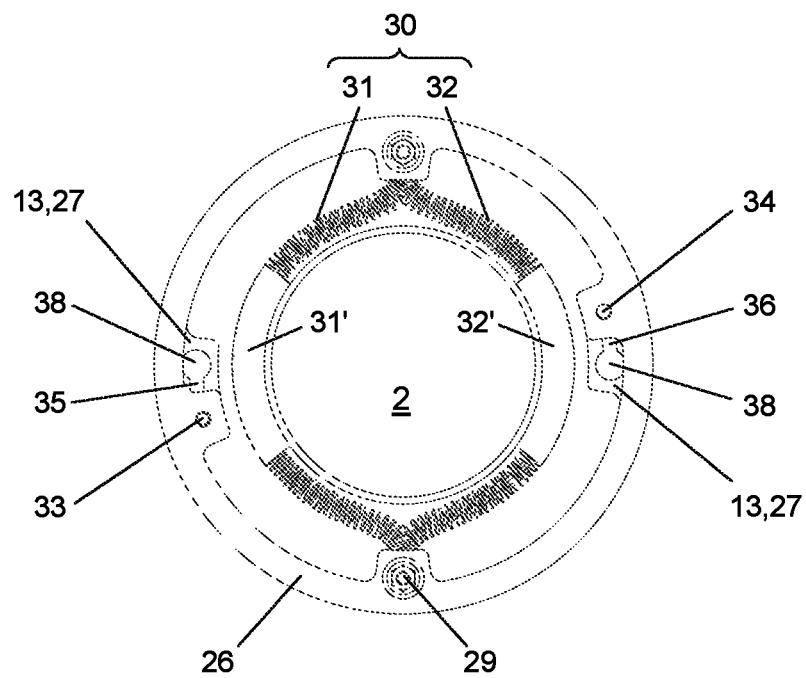

As shown in FIGS. 3 and 4b, the mast 2 that is passed therethrough forces or spreads apart the two spring elements 31, 32, meaning that they center the mast 2 in the solar module 7, 8 owing to their tension-spring force.

It is clear that the spring elements 31, 32 in a plurality of pairs 30 arranged above one another in the solar module 7, 8, e.g. the pairs 30 at the two ends of the solar module 7, 8, can also cross the interior of the solar module 7, 8 in different diametric directions. For example, two pairs 30 may cross the interior of the solar module 7, 8 orthogonally to one another, three pairs 30 may be offset from one another at a respective angle of 60°, four pairs 30 may be offset from one another at a respective angle of 45°, etc. The spring elements 31, 32 in a pair 30 may also cross the interior of the solar module 7, 8 in different diametric directions, even at different heights, because, then too, they are spread apart by the mast 2 that is passed therethrough, when viewed in the axial direction. This is particularly useful in those embodiments in which three, four or more spring elements 31, 32 at different heights of the solar module 7, 8 cross the interior of the solar module in different diametric directions, and this likewise centers the mast 2 in the solar module 7, 8. In this case, each two of these spring elements 31, 32 crossing at different heights and in different diametric directions then form a respective one of said spring-element pairs 30 that can be resiliently spread apart.

Instead of being in the form of tension coil springs, the spring elements 31, 32 may also be formed in another manner, for example as tension straps made of resilient plastics material or as pressure pieces or clamping jaws, which are mounted on the inner circumference of the solar module 7, 8 in a springy manner, e.g. on the rods 3 and/or the end rings 26, 27.

The disclosed subject matter is not limited to the embodiments set out, but instead covers all the variants, modifications and the combinations thereof that fall within the scope of the accompanying claims.

What is claimed is:

1. A solar power supply device for a light, comprising a tubular solar module that can be slid onto a mast, and
   a crown which can be fitted to the top of the mast and from which the tubular solar module is suspended, wherein the tubular solar module contains in its interior at least one pair of spring elements that cross the interior of the tubular solar module and can be resiliently spread apart when the mast is passed therethrough, wherein each spring element is a tension coil spring, which substantially diametrically crosses the interior of the tubular solar module when not spread apart.

2. The solar power supply device according to claim 1, wherein each tubular solar module comprises a tubular transparent body having photovoltaic elements on its inner face, the body being retained between two end rings, which are interconnected by rods extending in the interior of the tubular solar module.

3. The solar power supply device according to claim 1, wherein the crown also supports an end ring on its lower end.

4. The solar power supply device according to claim 1, wherein the crown has an inner shoulder for support on an upper face of the top of the mast and can be aligned coaxially with the mast by adjusting screws which are distributed over its inner circumference and can be brought into contact with the top of the mast.

5. The solar power supply device according to claim 1, wherein the crown supports at least one projecting arm for mounting a light.

6. A lighting device comprising a mast and a solar power supply device according to claim 1, the crown of which is fitted to the top of the mast and through the spread-apart spring elements of which the mast is passed through, and at least one light that is supported by the solar power supply device and is electrically powered thereby.

7. The solar power supply device according to claim 6, wherein another, identical tubular solar module is suspended from said tubular solar module.

8. A solar power supply device comprising a tubular solar module that can be slid onto a mast, and
   a crown which can be fitted to the top of the mast and from which the tubular solar module is suspended, wherein the tubular solar module contains in its interior at least one pair of spring elements that can be resiliently spread apart, between which the mast can be passed through,
   wherein the tubular solar module is movably connected to the crown.

9. The solar power supply device according to claim 8, wherein there is an axial gap between the tubular solar module and the crown, the tubular solar module and the crown being connected by at least two pins which are distributed over their circumference and are mounted on at least one of the tubular solar module and the crown with axial play.

10. The solar power supply device according to claim 1, wherein each pin is fixed to one of the tubular solar module and the crown and can be locked in a bayonet groove in the other one of the tubular solar module and the crown detachably and with axial play by means of a widened head.

11. The solar power supply device according to claim 1, wherein the crown also supports an end ring on its lower end, and
wherein the pins are mounted on the end ring.

12. The solar power supply device according to claim 8, wherein each tubular solar module comprises a tubular transparent body having photovoltaic elements on its inner face, the body being retained between two end rings, which are interconnected by rods extending in the interior of the tubular solar module.

13. The solar power supply device according to claim 8, wherein the crown has an inner shoulder for support on an upper face of the top of the mast and can be aligned coaxially with the mast by adjusting screws which are distributed over its inner circumference and can be brought into contact with the top of the mast.

14. The solar power supply device according to claim 8, wherein the crown supports at least one projecting arm for mounting a light.

15. A lighting device comprising a mast and a solar power supply device according to claim 8, the crown of which is fitted to the top of the mast and through the spread-apart spring elements of which the mast is passed through, and at least one light that is supported by the solar power supply device and is electrically powered thereby.

16. The solar power supply device according to claim 15, wherein another, identical tubular solar module is suspended from said tubular solar module.

17. A solar power supply device for a light, comprising a tubular solar module that can be slid onto a mast, and
a crown which can be fitted to the top of the mast and from which the tubular solar module is suspended, wherein the tubular solar module contains in its interior at least one pair of spring elements that cross the interior of the tubular solar module and can be resiliently spread apart when the mast is passed therethrough, wherein another, identical tubular solar module is suspended from said tubular solar module, wherein there is an axial gap between the tubular solar modules, the tubular solar modules being connected by at least two pins which are distributed over their circumference and are mounted on at least one of the two tubular solar modules with axial play.

18. The solar power supply device according to claim 17, wherein each pin is fixed to the one tubular solar module and can be locked in a bayonet groove in the other tubular solar module detachably and with axial play by a widened head.

19. The solar power supply device according to claim 17, wherein each tubular solar module comprises a tubular transparent body having photovoltaic elements on its inner face, the body being retained between two end rings, which are interconnected by rods extending in the interior of the tubular solar module, and
wherein the pins are mounted on the respective end ring.

20. A solar power supply device comprising a tubular solar module that can be slid onto a mast, and
a crown which can be fitted to the top of the mast and from which the tubular solar module is suspended, wherein the tubular solar module contains in its interior at least one pair of spring elements that can be resiliently spread apart, between which the mast can be passed through,
wherein another, identical tubular solar module is suspended from said solar tubular module, and
wherein said another tubular solar module is movably suspended from said tubular solar module.

* * * * *